March 14, 1967 J. W. GLINSKI 3,309,709

METHOD OF PERMANENTLY RECORDING ON A MAGNETIZABLE MEDIUM BY ABRADING

Filed March 1, 1963 3 Sheets-Sheet 1

INVENTOR.
JOHN W. GLINSKI

BY Spencer E. Olson

ATTORNEY

INVENTOR.
JOHN W. GLINSKI
BY Spencer E. Olson
ATTORNEY

INVENTOR.
JOHN W. GLINSKI
BY Spencer E. Olson
ATTORNEY

United States Patent Office 3,309,709

Patented Mar. 14, 1967

3,309,709

METHOD OF PERMANENTLY RECORDING ON A MAGNETIZABLE MEDIUM BY ABRADING

John W. Glinski, Pembroke, Mass., assignor to Sylvania Electric Products Inc., a corporation of Delaware Filed Mar. 1, 1963, Ser. No. 262,070

9 Claims. (Cl. 346—1)

This invention is concerned with electronic data processing techniques and particularly with the permanent recording of data.

Existing methods for performing the function of storing and reproducing data may be divided into three major categories:

First, a commonly used storage technique is to record data in binary bit form on cards or tapes by punching them with holes in coded area locations in conformance with signal inputs. The data thus stored is read by detecting the presence or absence of electrical contact or the passage of light through the punch holes.

Second, magnetizable tapes, drums or discs are employed to record and reproduce data in a binary bit format. These devices comprise a base material covered by a flux retentive magnetizable layer which is scanned by a magnetic reading or writing head. A bit of information is stored by energizing the head with an alternating or direct current signal whose amplitude, polarity, and timing are determined by the data to be stored. To accomplish this, the head is provided with a gap in which flux is created proportional to input current signals and magnetizes the record medium accordingly. The same or another head is used to detect changes in intensity of magnetization on the record during a "read" operation.

A third method for storage of digital information has been proposed by E. W. C. Russell in United States Patent 2,547,838. This method involves interrupting at selected intervals an evenly magnetized material, which covers the record base. The interruptions are produced by chemical etching or mechanical punching. Reading heads are then able to detect the voids in the magnetized coating.

Although the first method has been widely used, it requires cumbersome mechanical equipment and produces a document whose permanency is not to be relied upon due to its weakening and mutilation caused by the punched holes. The record has a tendency to tear along perforations formed by the punched holes, especially when high processing speeds and densities of stored data are attempted.

The second method is not suitable for permanent recording due to its inherent and intentional erasability.

The third method does provide a durable record, particularly when the aforementioned chemical etching technique is used thereby avoiding perforation of the base of the record medium, since the chemical etchant causes a void in the magnetized coating only. However, it is difficult to preferentially etch away the magnetized coating with the precision required by any recording technique. For instance, according to Russell's method, the etchant affects those areas of the record protected by a soluble material for which the etchant is a solvent. The protective soluble material is applied through a thin stencil and therefore might be applied at unwanted areas if it should run under the stencil; and furthermore, the chemical etchants normally used tend to attack imperfect or scratched areas of the record, as well as those covered by the soluble material, to cause readable interruptions where none are intended.

Accordingly, a primary object of the present invention is to provide a method for permanently recording on a magnetizable medium.

A further object is to provide a method for such recording which can be performed on equipment that is not unduly space consuming.

A still further object is to provide a method for recording data which is reliable in that only preferred parts of the record are affected.

Briefly, these objects are accomplished in accordance with the invention by first magnetically recording the data to be preserved on a conventional magnetizable medium, such as an oxide coated tape, card, disc, or drum. Thereafter, fine particles of magnetizable abrasive material, such as iron filings, are applied to the record medium, the particles adhering only to the discrete magnetic areas at which data is recorded. The iron particles are then excited by wave energy, such as ultrasonic waves, which causes the particles to vibrate rapidly, without being moved from the magnetized areas, this motion of the particles serving to abrade away the magnetizable layer of the record medium only at those areas that are initially magnetized. The result is the permanent recording of the originally magnetically impressed information, the areas or voids where the magnetizable coating is abraded being detectable by conventional reading heads, which detect changes in permeability or fringe flux produced by the voiding.

Other objects, features, and modifications of the invention will be apparent from the following description and reference to the accompanying drawings, in which.

Figure 1:
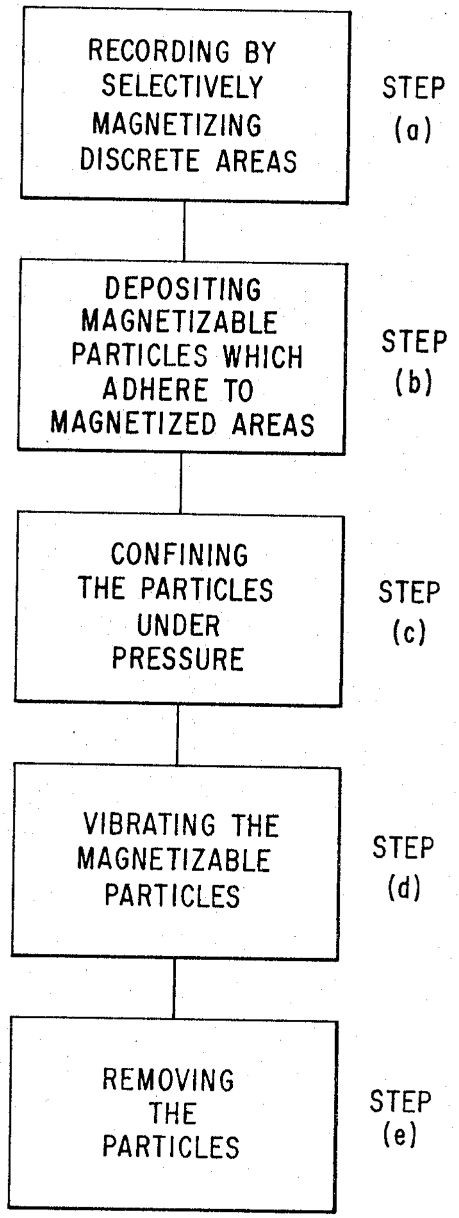
FIG. 1 is a representation of the steps of the method according to the invention for permanently recording information on a record medium.

Referring to FIG. 1, the method is illustrated as comprising five steps, which will hereinafter be designated steps (a) through (e). Considering first the preferred embodiment, the first step, step (a), in the making of a permanent record on any of the conventional magnetic recording media, such as tape, drum, disc, card, etc. which have a layer of flux retentive magnetizable material on one surface thereof, is to record data thereon, using known magnetic recording techniques. For example, the record medium may be scanned with a magnetic recording head provided with an air gap across which a fringing flux field is developed in response to an applied signal, and a magnetic flux pattern is impressed on the magnetizable layer. Ordinarily, the head is stationary, and the record medium moved past the head. Data recorded in this manner is read out by moving the record medium across the same or a similar head, which senses the flux patterns in or on the record. As is well known, data recorded in this manner can be intentionally erased by subjecting the record medium to a magnetic field, or it may be accidentally erased by an external electromagnetic field or by atomic radiation, such as might be present following a nuclear explosion. It is the purpose of the remaining steps of the present method to render permanent the otherwise erasably recorded data.

Figure 2:
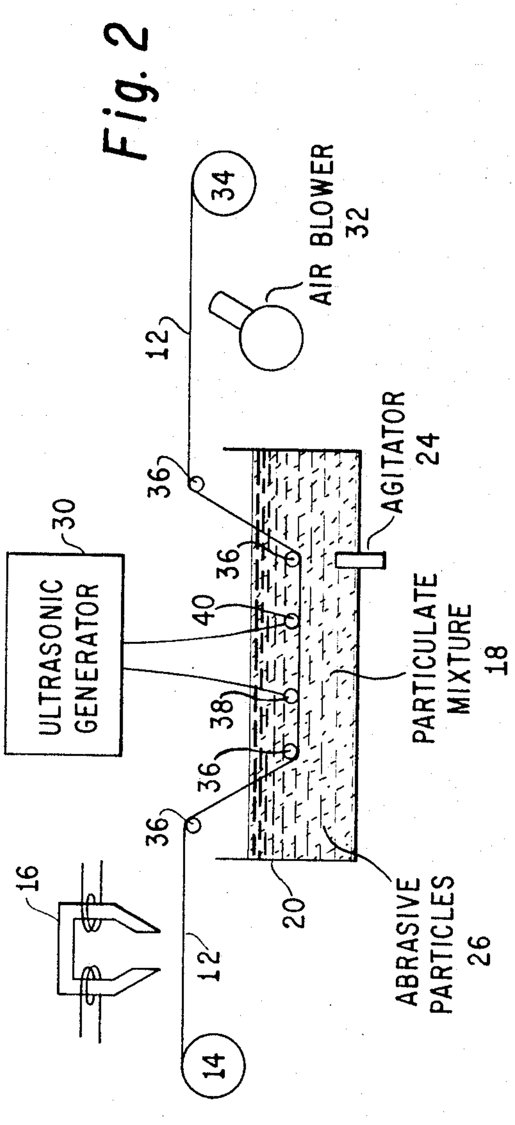
FIG. 2 is a schematic representation of one form of equipment useful in the practice of the method.

The next step toward this end, step (b), is the deposition of magnetizable abrasive particles, such as iron filings, on the record medium, these particles being preferentially attracted to the magnetized areas on the record. As shown in FIG. 2, the abrasive particles 26 may be suspended in a suitable fluid, such as water, in a container 20, and maintained in a stable suspended condition by agitating the mixture 18 with a suitable agitator 24, such as an oscillating convolute of the type used in many home washing machines. The recorded medium, shown as a tape 12 in FIG. 2, after passing the recording head 16 from reel 14 is guided through the suspension 18 by a plurality of rollers 36. Because of the agitation of the mixture 18, the iron filings 26 do not settle over the entire surface of the tape, but are preferentially attracted out of the suspension only to the magnetized areas.

In the arrangement of FIG. 2, steps (c) and (d) are also performed in the same container 20 in which the iron particles 26 are deposited on the tape 12. More specifically, the tape 12 is subjected to sound waves from an ultrasonic generator 30 whose electrodes 38 and 40 are positioned within the container 20 in the vicinity of the tape 12. The ultrasonic waves excite all of the iron particles 26 in the mixture 18, and of significance to the present method, cause those adhering to the magnetized areas to move about very rapidly without leaving the discrete magnetic areas to which they adhere, this motion of the particles causing them to effectively file away the magnetic coating on the magnetizable record 12. In other words, the magnetic attraction of the recorded areas, together with the weight of the fluid suspension 18 through which the tape 12 is moved, confine the particles 26 to the magnetized areas. As the magnetizable layer is removed by abrasion, the magnetic attraction, of course, disappears, and as the tape 12 emerges from the suspension 18 the abraded areas are essentially free of iron particles 26. Using an ultrasonic generator 30 producing a wave having a frequency of the order of 200 kilocycles, it has been found that substantially the entire thickness of the magnetizable coating is abraded away in approximately 30 minutes. However, acceptable discrimination between signals is achieved by abrasion to a depth of the order of 80% of the thickness of the magnetizable coating, which can be achieved in a shorter time. Any particles 26 remaining on the tape 12 due to electrostatic attraction or adherence to any unetched magnetic coating as it emerges from the container 20 may be removed according to step (e) by a stream of air from a suitable blower 32, and the permanent record is then wound on take-up reel 34.

Considering an alternative embodiment illustrated in FIG. 3, step (a) in the making of a permanent record on the magnetic record medium is the same as that described in connection with FIG. 2. After the record 12 has been impressed with digital intelligence, the next step, step (b), is the deposition of magnetizable abrasive particles 26 on the record medium 12. This is accomplished by passing the record through a suitable container 22 which has dispersed therein a mixture of iron filings 26 and air as the fluid. The mixture is maintained in a stable condition, with the particles 26 suspended, by agitating the mixture with a suitable agitator 25, such as a blower, to an extent sufficient to prevent settling of the abrasive iron particles 26 to the bottom of the container 22. The suspended particles 26 are preferentially magnetically attracted to the magnetized areas of the record 12.

Figure 3:
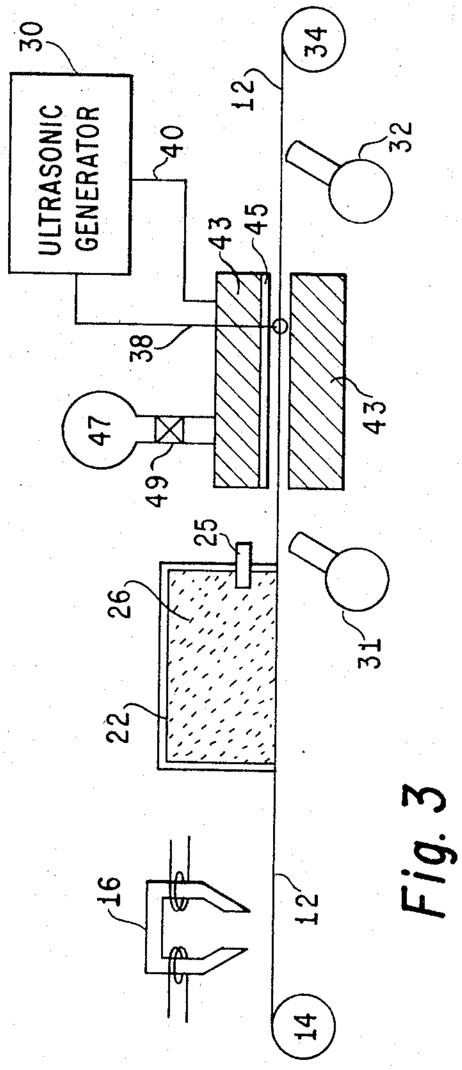
FIG. 3 is a schematic representation of equipment useful in practicing an alternative embodiment of the invention.

In the arrangement of FIG. 3, step (c) involves the transportation of the record medium 12 to a position between a pair of pressure blocks 43, the blocks being actuable by a hydraulic supply 47 and a valve 49. Prior to entering the pressure blocks, the record is moved past a blower 31, where excess particles not attracted to magnetized areas in step (b) are blown free. With the tape stopped at that position, and with pressure applied via hydraulic supply, 47, the pressure blocks 43 confine the magnetically attracted particles 26 to the discrete areas magnetically recorded in step (a), so that, upon operation of ultrasonic generator 30 which is connected to upper plate 43 via electrode 40 and to the record medium via electrode 38, the vibration of the particles produces abrasion only in the desired areas. It has been found that if the surface of the block 43 which contacts the recorded side of the record medium is coated with a layer 45 of suitable plastic, such as mylar, the vibration of the abrasive particles is not impeded by the pressure blocks. Should the motion of any of the particles be restricted by the coating 45, they would quickly abrade away the mylar and continue abrading the magnetic coating of the record medium 12.

After the magnetic coating is abraded to a suitable depth, which may be completely to the base material of the tape, or to a lesser depth in certain cases, the pressure valve 49 is actuated to release the pressure blocks 43 and the tape is moved from between the blocks and past an air blower 32, which removes any particles adhering to the tape by electrostatic attraction or attraction to incompletely etched magnetized areas. The tape is then wound on take-up reel 34.

It should be understood that the materials and equipment mentioned in the description of FIGS. 1, 2 and 3 are illustrative only, and substitutes are used and others contemplated. For instance, it is not necessary that the abrasive particles be iron. Nickel-cobalt and other abrasive and magnetizable metals or metal compounds may be used. Also, the coating of the upper block used in the apparatus of FIG. 3 is not necessarily mylar, since other materials are contemplated. Furthermore, alternating electromagnetic energy waves rather than ultrasonic waves may be used to cause vibration of the particles.

Figure 4:
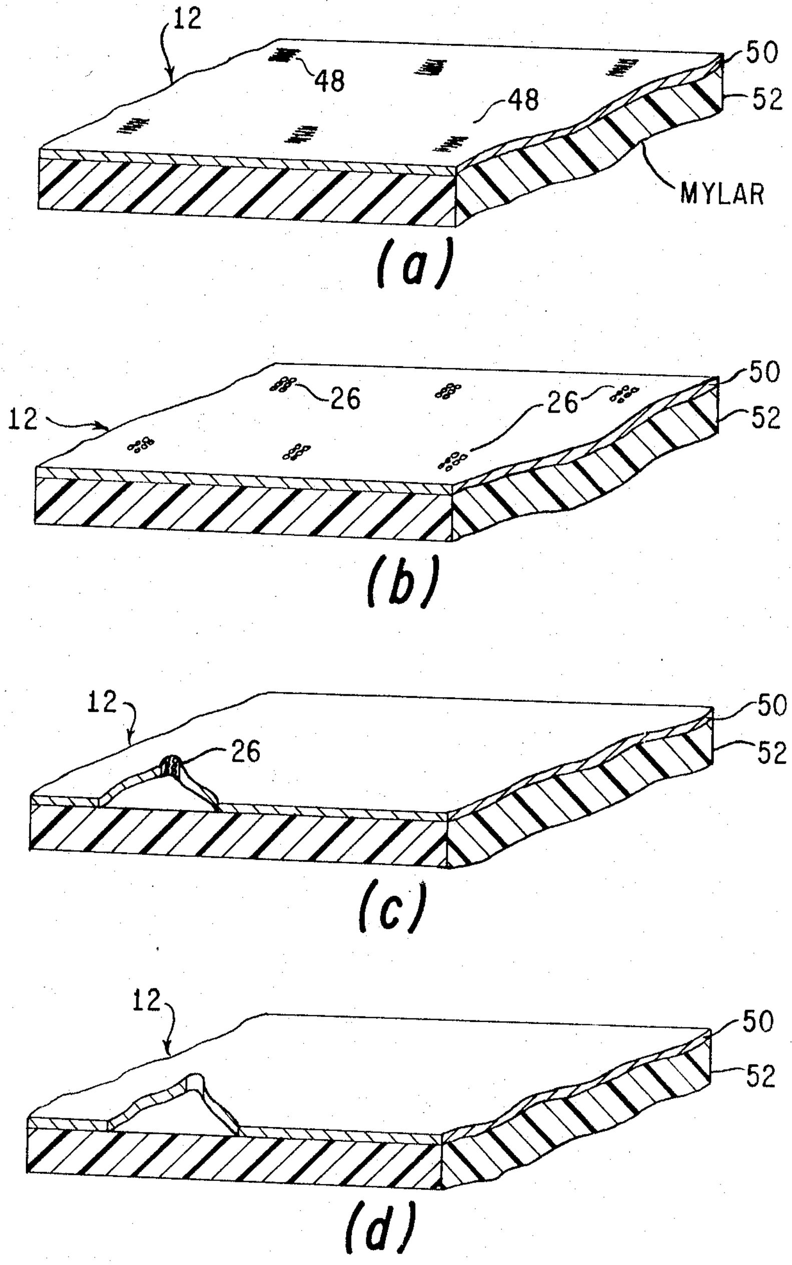
FIGS. 4*a* through 4*d* are perspective views of a fragmentary portion of the record medium, illustrating its appearance following certain of the steps of the method diagrammed in FIG. 1.

FIGS. 4*a* through 4*d* are perspective views of a fragmentary portion of the record medium 12, respectively illustrating its appearance following steps (a), (b), (d) and (e) of the method shown in FIG. 1. The record medium 12 comprises a base material 52 covered by a magnetizable layer 50 of which discrete areas are selectively magnetized according to a given input. Preferably, the input is of binary coded digital intelligence and the recording method of step (a) of FIG. 1 results in the representation of binary "ones" by the discretely magnetized areas 48 shown in FIG. 4*a*. Binary "zeros" are represented by the absence of magnetization of the magnetizable layer in coded area locations on the record medium. After the record medium 12 has passed through a suspension of iron particles in a suitable fluid, the particles 26 adhere to the magnetized areas of the magnetizable layer as shown in FIG. 4*b*. These abrasive particles are confined in place by the weight of the liquid in FIG. 2, or the pressure blocks in FIG. 3, and upon being vibrated by the energy from an ultrasonic generator, or the like, abrade the magnetizable layer. At the conclusion of this step, the areas of the layer which were magnetized are removed, one such area being shown in FIG. 4*c*.

Abrasive particles tend to adhere to the location of the areas previously magnetized in step (a) if the vibrating step (d) fails to abrade the selected areas in total; that is, non-abraded segments of the areas 48 will continue to attract the particles 26 after the abrasive process of step (d). The method is, however, operative as long as the selectively magnetized areas 48 are abraded sufficiently so that conventional reading heads can differentiate between binary "ones" and "zeros" on the record 12. Such excess particles remaining after the abrasion step of the process has been completed are removed by an air blower 32, and the final permanent record 12 is as shown in FIG. 4*d*.

While particular embodiments of the invention have been shown and described, modifications may be made, and it is intended in the appended claims to cover all such modifications that fall within the true spirit and scope of the invention.

What is claimed is:

1. A method for permanently recording data on a magnetizable record medium comprising the steps of:
   selectively magnetizing discrete areas of the record medium according to given input data;

depositing particles of magnetizable material on said discrete areas of said medium;

producing abrasive action on said areas by vibrating said particles whereby a permanent record of said data is produced by the deformation of the surface of said medium at said areas; and thereafter removing said particles from the record medium.

2. The invention according to claim 1 wherein said particles are iron filings.

3. The invention according to claim 1 wherein said particles are vibrated by ultrasonic waves.

4. The invention according to claim 1 wherein the particles are removed from the record medium by a stream of air.

5. A method for permanently recording data on a magnetizable record medium comprising the steps of:

selectively magnetizing discrete areas of the record medium according to given input signals;

passing the medium through a stable mixture of magnetizable particles suspended in a fluid to cause particles to deposit on said discrete areas;

producing abrasive action on said areas by vibrating said particles under pressure whereby a permanent record of said input signals is produced by the deformation of the surface of said medium at said areas; and thereafter removing said particles.

6. A method for permanently recording data on a magnetizable record medium comprising the steps of:

selectively magnetizing discrete areas of the record medium according to given input data;

depositing on said record medium particles of magnetizable material, which are preferentially attracted to said discrete areas;

confining said particles to said discrete areas by placing the record medium between pressure blocks, the one covering the recorded side of the medium being coated with mylar;

vibrating said particles to abrade said discrete areas whereby a permanent record of said data is produced by the deformation of the surface of said medium at said areas;

separating said mylar-coated block from the record medium; and thereafter removing the particles from the medium.

7. A method for permanently recording data on a magnetizable record medium comprising the steps of:

selectively magnetizing discrete areas of the record medium according to given input data;

passing the medium through a stable mixture of magnetizable particles suspended in water to cause particles to deposit on said discrete areas;

producing abrasive action on said areas by vibrating said particles whereby a permanent record of said data is produced by the deformation of the surface of said medium at said areas; and thereafter removing said particles from the medium.

8. The invention according to claim 7 wherein said particles are vibrated by ultrasonic waves.

9. The invention according to claim 8 wherein said magnetizable particles are iron filings.

References Cited by the Examiner

UNITED STATES PATENTS

| | | | |
|---|---|---|---|
| 2,657,932 | 11/1953 | Blaney | 101 |
| 3,142,840 | 7/1964 | Smith | 346—74 |

BERNARD KONICK, *Primary Examiner.*

J. BREIMAYER, *Assistant Examiner.*